May 24, 1932.  W. L. FLEISHER  1,859,770
VAPORIZER
Filed Feb. 8, 1928   5 Sheets-Sheet 1

INVENTOR.
Walter L. Fleisher
BY
ATTORNEYS.

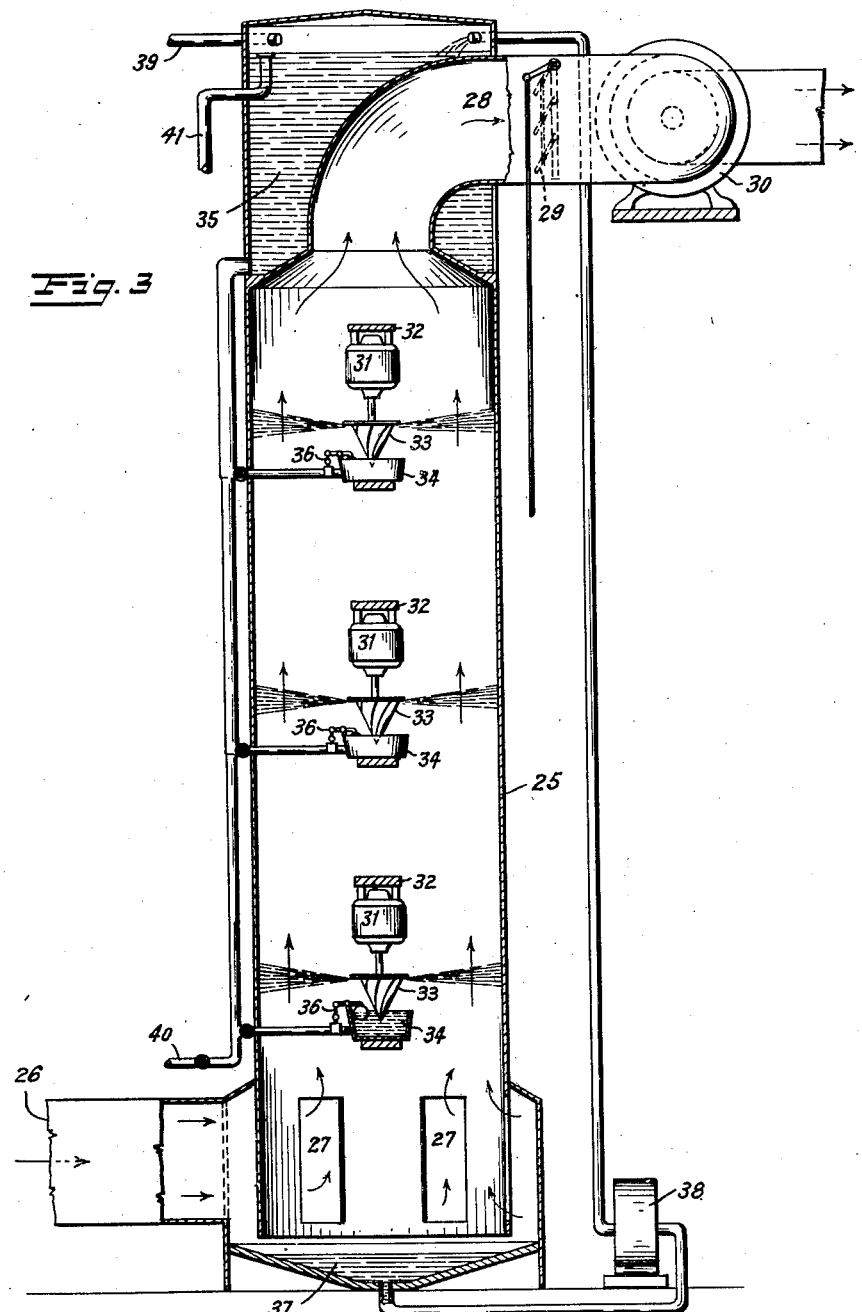

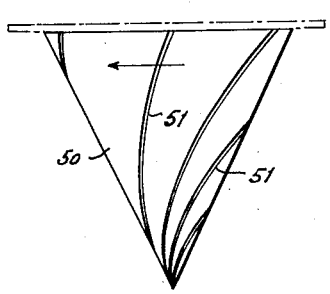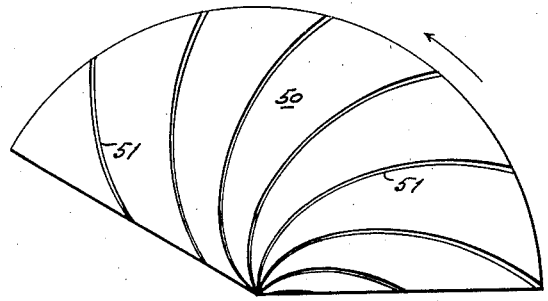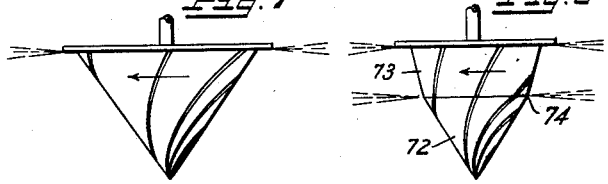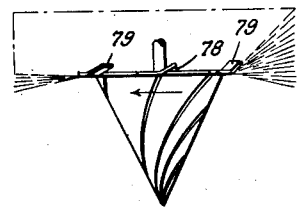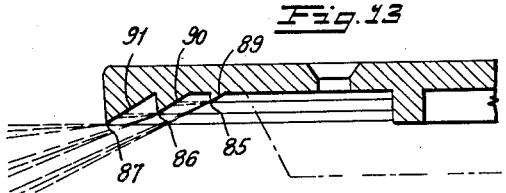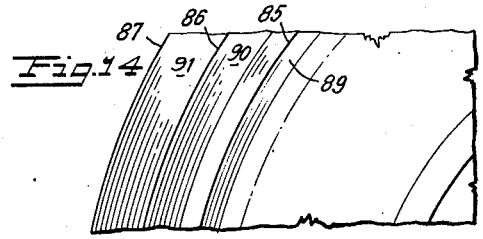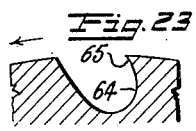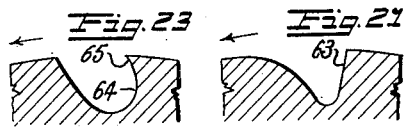

May 24, 1932.   W. L. FLEISHER   1,859,770
VAPORIZER
Filed Feb. 8, 1928   5 Sheets-Sheet 4
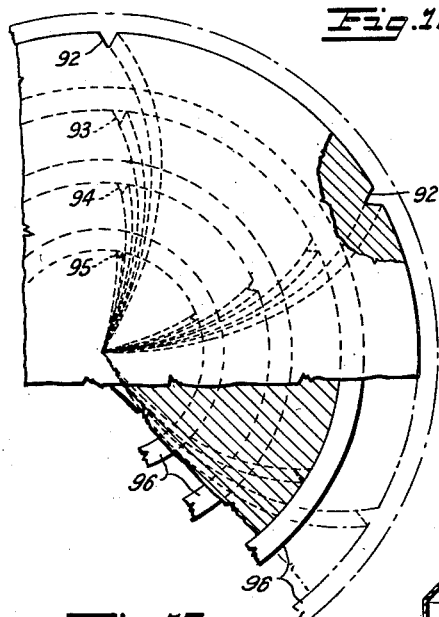
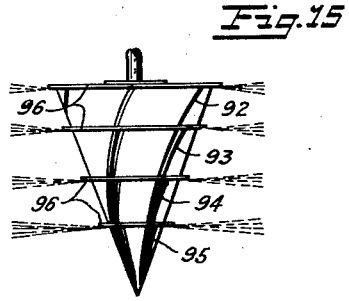
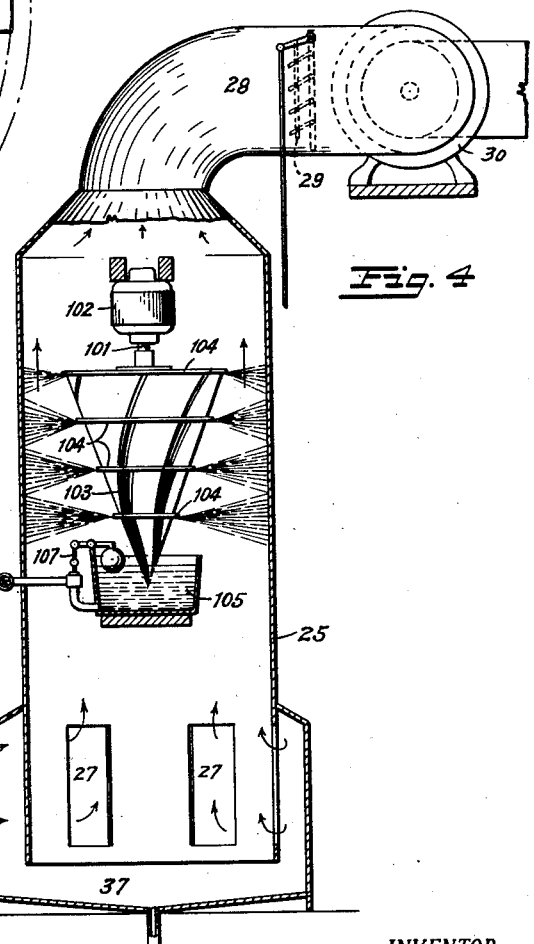
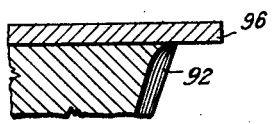
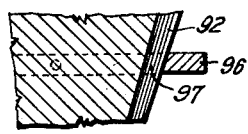
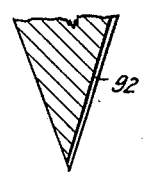
INVENTOR.
Walter L. Fleisher
BY
ATTORNEYS.

May 24, 1932.  W. L. FLEISHER  1,859,770
VAPORIZER
Filed Feb. 8, 1928   5 Sheets-Sheet 5
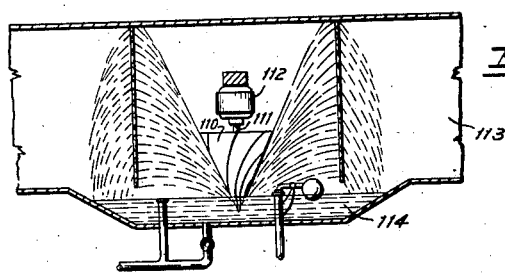
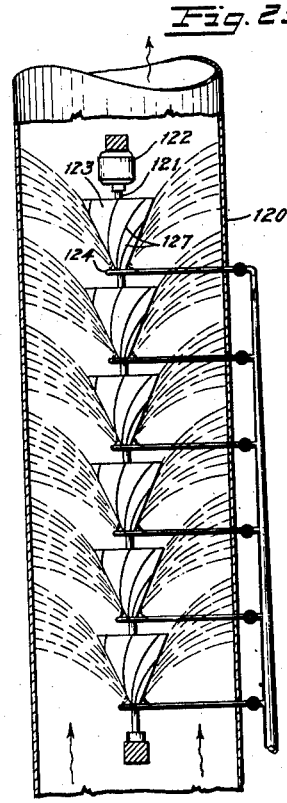
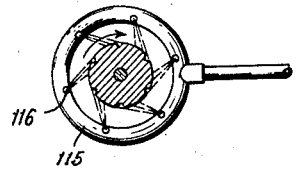
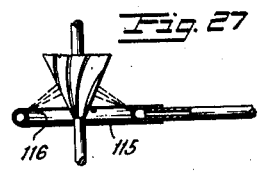
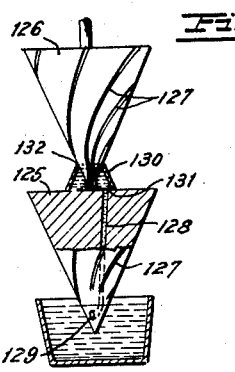
INVENTOR.
Walter L. Fleisher
BY
ATTORNEYS.

Patented May 24, 1932

1,859,770

UNITED STATES PATENT OFFICE

WALTER L. FLEISHER, OF NEW YORK, N. Y., ASSIGNOR TO THE COOLING & AIR CONDITIONING CORPORATION, OF NEW YORK, N. Y., A CORPORATION OF NEW YORK

VAPORIZER

Application filed February 8, 1928. Serial No. 252,760.

This invention relates to vaporizers. It is an object of this invention to provide a vaporizing device which will atomize a large quantity of liquid with a minimum of power. It is a further object to provide a device which is adapted to a wide variety of uses and which, to that end, is capable of producing either a sheet of liquid or a very fine widely disseminated mist.

It is a further object to produce a device which will handle a large amount of liquid efficiently and economically and with freedom from noise. It is a further object to produce a device which may be manufactured inexpensively and which will be durable and efficient in operation.

The invention will be herein exemplified in connection with dispersing of water vapor into air, particularly for the purposes of air moistening or conditioning.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:—

Fig. 3 is a vertical section through a vaporizer adapted to handle large quantities of air, such for example as are employed in ventilating systems.

Fig. 4 is a view similar to Fig. 3 of a slightly modified structure.

Figs. 5, 7, 8, 9 and 10 are elevations of different forms of cones which may be employed as the pumping and vaporizing element.

Fig. 6 is a development of the cone of Fig. 5.

Fig. 11 is a view of a modification employing a special form of distributing disc which may be employed.

Fig. 12 is a plan of the disc employed.

Fig. 13 is a vertical section enlarged, of a different form of disc.

Fig. 14 is a bottom plan view of the same.

Figs. 15, 16, 17, 18 and 19 are a side elevation and details of another form of pumping and atomizing element.

Figs. 20, 21, 22 and 23 are sectoral views of various types of rifling or grooves which may be employed.

Fig. 24 is a section of a horizontal air washer employing a modified type of vaporizer.

Fig. 25 is a vertical section through a vertical vaporizer employing a plurality of cones.

Figs. 26 and 27 are details of the vaporizer employed in the device of Fig. 25.

Fig. 28 is a modification showing two cones superposed.

Figure 1:
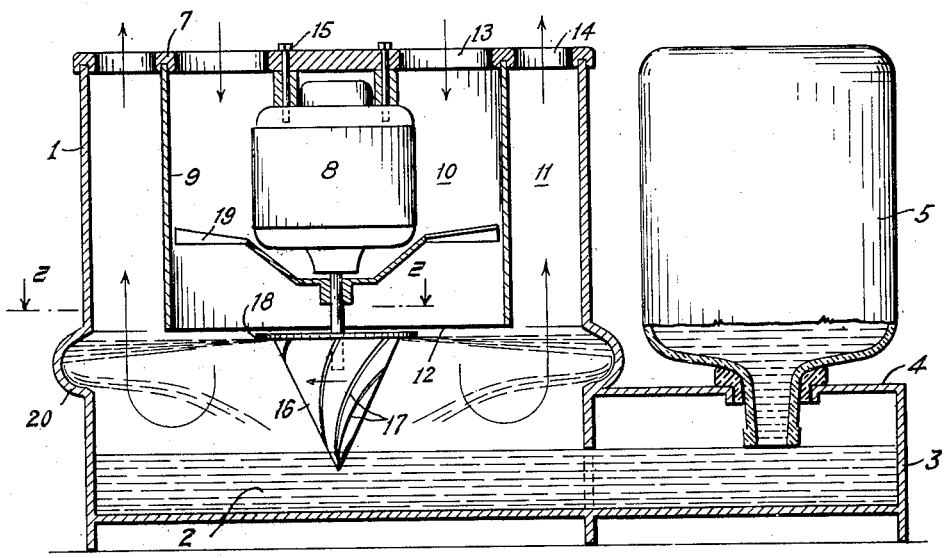
Fig. 1 is a vertical section through a self contained vaporizer such as may be employed for moistening residences, or in smaller sizes, with a wet bulb thermometer.
Figure 2:
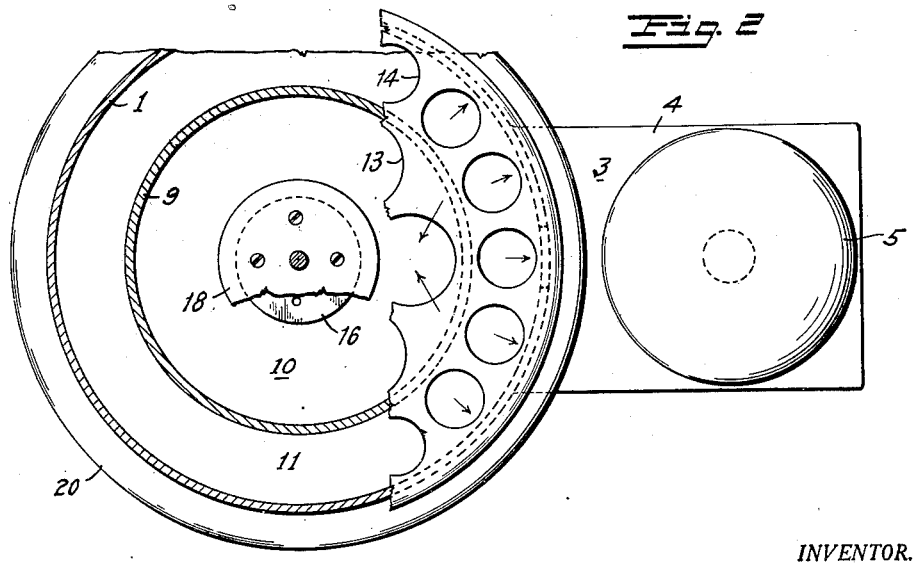
Fig. 2 is a horizontal section on the lines 2—2 of Fig. 1.

In the drawings the numeral 1 designates a cylindrical casing, water tight at the bottom to provide a sump 2. The casing has a laterally extending portion 3 having a cover 4 adapted to receive and support an inverted bottle 5, by which the water level may be maintained in the sump on the familiar barometric principle.

The casing 1 has a cover 7 from which are concentrically supported a motor 8 and a depending sleeve 9. The sleeve 9 divides the space within the casing into two concentric passage ways, the inner one 10, between the motor and the sleeve, and the other or outer 11, between the sleeve and the casing. These communicate at the bottom by reason of the fact that the lower edge 12 of the sleeve is above the water level in the sump. Openings 13 and 14 are provided through said cover into the inner and outer passageways.

The motor 8 is supported from the cover by bolts 15 with its shaft vertically downward. At the lower end of the shaft is supported a pumping and vaporizing element 16 which takes the form of an inverted solid cone having its apex extending into the water of the sump, and its outer surface provided with grooves or rifling as shown at 17. The upper or base end of the cone may be somewhat below the lower end 12 of the sleeve, and it may terminate in a disc 18 of slightly larger diameter than the base, whereby water flowing up the cone surface meets with the obstructing horizontal under surface 15 of the under side of the disc to be thrown outwardly thereby.

The word cone is employed as a convenient designation of the pumping element although in many instances it may be desirable to employ conoidal surfaces which are not true or simple cones. A fan 19 is mounted on the shaft of the motor, above the cone, and within the sleeve 9, whereby air is forced in one of the concentric passageways as for example 10 and out the other 11. It is preferably delivered downwardly in the central passage.

The casing may be provided with a curved bead 20 in position to receive the spray projected from the pump, tangentially, and change its direction, causing a portion of it to be again projected back into the air.

It has been found that many advantages accrue from the type of pump here employed. It may be directly turned from solid stock so that it may be made accurately concentric and hence it may be satisfactorily rotated at high speed without vibration, thereby insuring a thoroughness of atomization, otherwise impossible. The large amount of water discharged because of the rifling and the high speed make it possible to employ a cone of such small size that it may be made solid, whereby it may be caused to operate silently, a very important result which is not obtained in many instances where sheet metal is used, because of the resonating and vibratory character of the sheet metal. This also eliminates another limitation on the practical speed which may be employed.

In the form of the invention illustrated in Fig. 3, a vertical casing 25, has at its lower end an air inlet 26, preferably communicating with the casing by a plurality of openings 27 symmetrically spaced about the circumference so that the flow of air upwardly through the casing may be equally distributed over its area. The casing is provided with an air outlet 28 at its upper end and may if desired have louvers 29 and a fan 30 to control the movement of air through the casing.

Spaced one above another in the casing area are a plurality of atomizing devices each comprising a motor 31, supported from a bracket 32 carried by the casing, and carrying on the lower end of the shaft an atomizing pump 33, dipping into a sump of water 34. Water is supplied to the sumps from any suitable source. As illustrated there is provided a reservoir 35 at the top of the casing from which water may be fed to the several sumps, each under the control of a float valve 36.

The unevaporated water from the sprays is collected at the bottom of the casing in a pan 37 from which it may be pumped back into the reservoir by a pump 38. Fresh water may be supplied to the reservoir from a pipe 39, and the water may be drained from it by pipe 40. An overflow 41 may also be provided if desired.

By the above construction water may be discharged outwardly by each of the atomizers in the form of a fine mist, but in such volume as to constitute a sheet across the casing such that the air passing upwardly comes into thorough contact with the water at each atomizer and is thoroughly washed and conditioned.

In Figs. 5 to 10 are shown several types of atomizer which may be employed. In the construction of Fig. 5 the elements 50 of the cone make an angle of 50°, and six equal spaced grooves 51 are cut in its surface from the apex spirally up toward the base. These grooves preferably incline at a greater angle to the elements of the cone toward the top than at the apex, the inclination being backwards of rotation so that the inertia of the liquid will assist in carrying the liquid up the grooves.

In Fig. 6 is shown a development of the surface of the cone shown in Fig. 5, showing the form and distribution of the grooves, in this modification, which has been found effective. The arrow denotes the direction of rotation.

The shape and character of the grooves may be altered to meet different conditions. In Fig. 20 is illustrated a V shape groove having a rounded bottom 60, and a rear wall 61. This form has proven very satisfactory. In Figs. 21, 22 and 23 are shown different cross sections having increasingly precipitate rear walls 62, 63, 64, until in the last figure the wall is under cut as shown at 65 to increase the volume of water carried up.

For some purposes it is desirable to change the cross section from the apex toward the base, making the rear wall less precipitate toward the base. In this manner a large quantity of water may be picked up, and carried upwardly to be discharged either in a localized plane at the top, or throughout the cone surface as desired.

In the form illustrated in Fig. 7 the cone elements have an angle of 70°. Such a cone discharges a greater volume of moisture than the cone of Fig. 5, but the atomization is not so fine.

In the form illustrated in Fig. 8, the lower half 72 of the cone has a different pitch than the upper half 73. This blunter lower portion 72 can thus be made to pick up more water than the steeper sides of the upper portion will carry. A portion of the liquid is thus discharged from the juncture 74 of the two cones, the remainder of the liquid being carried to the top of the upper cone. Two sheets of spray are thus provided from a single cone.

In Fig. 9 is illustrated a further modification in which the pitch of the cone is gradually increased upwardly as shown at 75. This causes the liquid to be discharged tangentially throughout the entire height of the cone.

In the form of Fig. 10, the pitch of the grooves 76 is forward. Such a groove tends to pick up less water, than the reverse grooves, but it results in a finer atomization. Moreover the pitch of the grooves can be so determined as to cause the spray to be delivered in any horizontal plane, or distributed through any vertical portion of the cone desired.

In the form of Fig. 11 the solid disc illustrated in Fig. 1 is replaced by a disc having its edge 77 cut as at 78 to form fan blades 79 such that the discharge of the cone is disseminated by the blades.

Fig. 12 illustrates the form of disc employed in Fig. 11.

Figs. 13 and 14 illustrate a form of disc provided upon its under surface with a plurality of concentric ridges 85, 86 and 87 or flutings each, having a downwardly inclined surface 89, 90 and 91, by which the spray is broken up, and deflected downwardly. As illustrated, each of the outer ridges extends further down than the inner ones.

In the form of the invention illustrated in Figs. 15, 16, 17, 18 and 19, the cone is provided with a plurality of sets of grooves 92, 93, 94 and 95, four sets being shown, the grooves of each set terminating in a different horizontal plane. This causes a portion of the liquid to be discharged in each of those planes. To further assist in this there may be provided an annular disc 96 for each of the planes, adapted to fit over the cone just above the termination of the corresponding grooves whereby the liquid discharged from the grooves is intercepted by the under surface of the discs and discharged tangentially as seen in Fig. 16. Each set of grooves is continuous beneath each of the discs lower than its own plane of termination as shown at 97 in Fig. 18, so that it may carry the water upwardly beneath the lower discs.

The form of the invention just described is eminently fitted for use in the air washer illustrated in Fig. 4. This washer is similar in many respects to the washer of Fig. 3 save that in place of the plurality of cones of the former washer, a single cone is employed of the form just described, mounted on the shaft 101 on the motor 102 and having grooves 103 and discs 104 as described, which define four planes of atomization. A sump 105 is supplied with water from a pipe 106 by a float valve 107.

With this construction there is delivered from the cone a fine mist which is cast off with such velocity as to occupy the space between the cone and the casing, and the different planes of discharge are so close together as to merge one into another. Thus every particle of air is brought into direct contact with the spray.

In the form of the invention shown in Fig. 24 a cone 110 is employed mounted on a vertical shaft 111 and run by a motor 112 situated in a horizontal conduit 113, with its apex dipping into a sump 114 within the conduit. This cone is preferably employed without the disc at its base and the rifling is such as to distribute a large quantity of water upwardly as well as laterally in a form of a fine mist. A device of this kind produces a very effective contact between the air and water.

In Figs. 26 and 27 is illustrated a modification suitable where it is desired to feed water to the cone, rather than submerging its point. In accordance with this modification there may be provided a ring 115 of pipe having perforations 116 on its interior arranged to permit water to be projected upon the surface of the cone tangentially in the direction of rotation. This water is preferably admitted to the cone at the center where the peripheral velocity is low, and is carried upwardly by the rifling to be laterally discharged, at the base.

In the form of the invention illustrated in Fig. 25 there is provided a vertical casing 120 in which is mounted a vertical shaft 121 driven by a motor 122. On this shaft are mounted a plurality of superposed cones 123, each of the character just described. Each of these is supplied with water from an annular nozzle 124 such as has been previously described. Each of these cones provides a fine spray upwardly and outwardly completely filling the casing and thereby affording the most efficient contact between the air and the water.

In the form of the invention illustrated in Fig. 28 there are provided two superposed cones, 125 and 126, both of which are supplied with water from a sump into which the lower cone 125 dips. Each of these cones is provided with the superficial grooves 127 as has been already described. Within the interior of the lower cone there is provided a bore 128 having an opening 129 below the intended water level of the sump and facing in the direction of rotation of the cone. The upper cone is preferably substantially resting upon the lower and surrounding its apex is a sleeve 130 making a water tight joint with the top surface of the lower cone, and thereby forming a pocket within which lies the upper end 131 of the bore. The sleeve has its upper edge 132 substantially touching the upper cone being either in direct contact with it or spaced from it sufficiently to permit a film of water to rise above it. With this construction it will be clear that as the cones rotate water will be fed to the interior of the sleeves from the lower sump by the bore acting as a pump. This space within this sleeve will therefore act as a sump to furnish the water supply of the upper cone.

With any of the above constructions it has been found that a very thorough contact can be obtained resulting in rapid vaporization, and a thorough impregnation of the air with the liquid vapors.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described the invention, what is claimed as new is:

1. A vaporizer comprising a solid conical body means for supporting the same and for rotating it about its axis at atomizing peripheral velocity and rifling upon its exterior extending from the apex toward the base said rifling comprising a series of grooves terminating in various planes and means for supplying liquid to the apex.

2. A vaporizer comprising a conoidal body means for supporting the same and for rotating it about its axis at atomizing peripheral velocity, rifling upon its exterior extending from its apex, some of said rifling terminating in different circumferential planes from the remainder and means for supporting the same and for rotating it about its axis at atomizing peripheral velocity, said cone having a plurality of grooves on its exterior extending from the apex upwardly toward the base, certain of said grooves terminating in different horizontal planes from the remainder, a projection upon the surface of said cone immediately above the termination of each of said grooves.

3. A vaporizer comprising a conoidal body means for supporting the same and for rotating it about its axis at atomizing peripheral velocity, said cone having a plurality of grooves on its exterior extending from the apex upwardly toward the base, certain of said grooves terminating in different horizontal planes from the remainder, a deflecting surface at the upper end of each of said grooves to throw the water outwardly.

4. A vaporizer comprising a conoidal body means for supporting the same and for rotating it about its axis at atomizing peripheral velocity, said cone having a plurality of grooves on its exterior extending from the apex upwardly toward the base, certain of said grooves terminating in different horizontal planes from the remainder, a disc surrounding said cone immediately above the termination of each of said grooves, certain of said grooves being continued below certain of said discs.

In testimony whereof I affix my signature.

WALTER L. FLEISHER.